(12) United States Patent
Otake

(10) Patent No.: US 6,257,108 B1
(45) Date of Patent: Jul. 10, 2001

(54) WORK TRANSFER METHOD AND APPARATUS IN MACHINE TOOL WITH MOVABLE SPINDLE AND MACHINING SYSTEM

(75) Inventor: Kimitaka Otake, Abiko (JP)

(73) Assignee: Hitachi Seiki Co., Ltd., Abiko (JP)

( * ) Notice: Subject to any disclaimer, the term of this patent is extended or adjusted under 35 U.S.C. 154(b) by 0 days.

(21) Appl. No.: 09/395,931

(22) Filed: Sep. 14, 1999

(51) Int. Cl.⁷ .................................................... B23B 1/00
(52) U.S. Cl. .............................. 82/1.11; 82/118; 82/124; 82/133
(58) Field of Search ........................... 82/1.11, 118, 120, 82/121, 124, 133, 134

(56) References Cited

U.S. PATENT DOCUMENTS

| | | | |
|---|---|---|---|
| 5,081,889 | * | 1/1992 | Takano et al. ........................ 82/122 |
| 5,459,915 | * | 10/1995 | Mendenhall ........................ 82/129 X |
| 5,844,593 | * | 12/1998 | Proffitt et al. ........................ 347/262 |

FOREIGN PATENT DOCUMENTS

| | | |
|---|---|---|
| 2-46321 | 10/1990 | (JP) . |
| 11-114701 | 4/1999 | (JP) . |
| 11-170101 | 6/1999 | (JP) . |
| 11-226801 | 8/1999 | (JP) . |

* cited by examiner

Primary Examiner—Henry Tsai
(74) Attorney, Agent, or Firm—Armstrong, Westerman, Hattori, McLeland & Naughton

(57) ABSTRACT

In a work transfer method in a machine tool with a movable spindle, a machined work transfer portion for laying a machined work on a first pallet and for transferring the work is disposed in an upper stage or a lower stage of a non-machined work transfer portion for laying a non-machined work on a second pallet and for transferring the work. Then, the non-machined work pallet is moved between a non-machined work receiving position and a work loading position. The machined work pallet is moved between a machined work sending position and a work unloading position. Thus, the work is received or sent between a chuck and a work transfer apparatus.

28 Claims, 9 Drawing Sheets

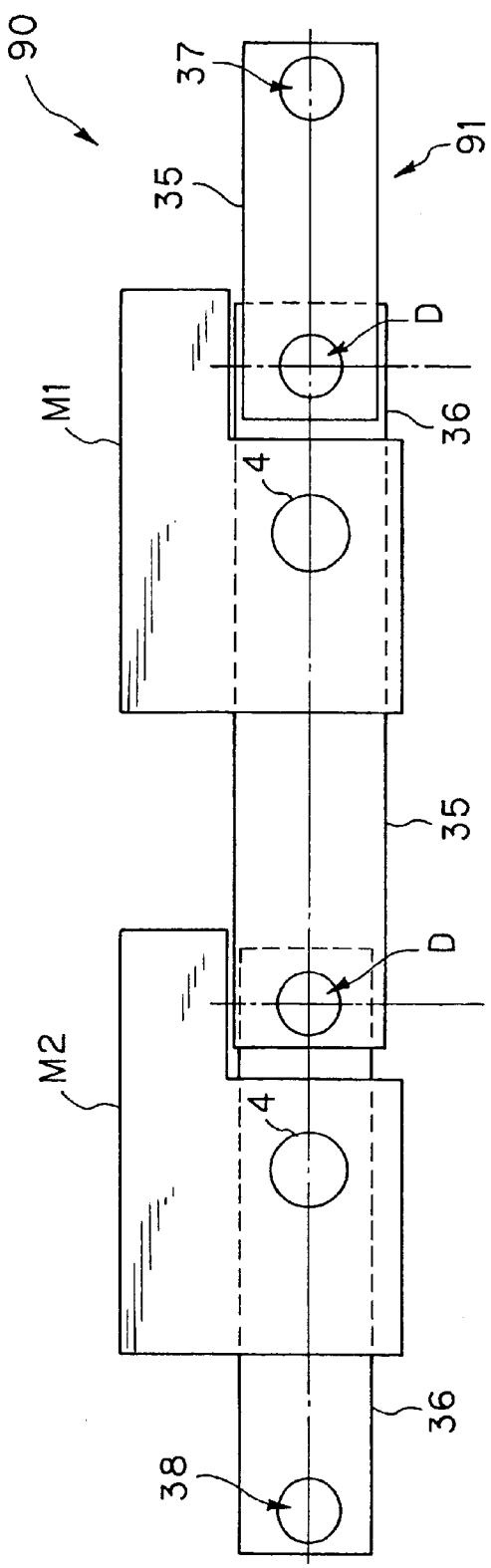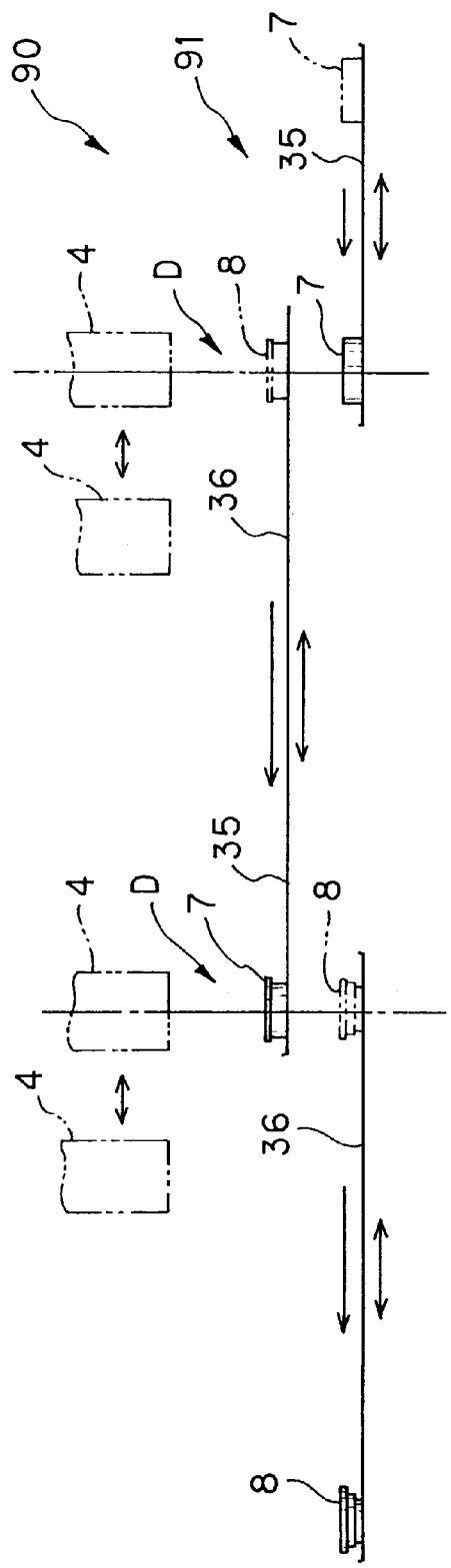

WORK TRANSFER METHOD AND APPARATUS IN MACHINE TOOL WITH MOVABLE SPINDLE AND MACHINING SYSTEM

BACKGROUND OF THE INVENTION

1. Field of the Invention

The present invention relates to a work transfer method and a work transfer apparatus in a machine tool with a movable main spindle (i.e., movable spindle type machine tool) and a machining system therefor. In this machine tool, a headstock for rotatably supporting the spindle may move at least in an axial direction (Z-axis direction) of the spindle and in a direction (X-axis direction) perpendicular to the axial direction of the spindle. The work transfer apparatus serves to transfer a work (workpiece) in and out. The machine tool receives and sends the work between a chuck provided at a lower end of the spindle and the apparatus for transferring the work.

2. Related Art

A work changer for changing works for the machine tool with the movable main spindle as related art (Japanese Patent Application No. 9-362060, i.e., Japanese Patent Application Laid-Open No. 11-170101) has been proposed. In this work changer, two or four portions for placing the works are formed in parallel with each other in a horizontal plane, and these portions for placing the works (work placement portions) are rotated or moved back and forth.

Also, other related arts such as a work feeder in the machine tool with the movable main spindle (Japanese Patent Application No. 9-297774, i.e., Japanese Patent Application Laid-Open No. 11-114701) and a work stocker (Japanese Patent Application No. 10-48840, i.e., Japanese Patent Application Laid-Open No. 11-226801) have been proposed. In the work feeder and the work stocker, a plurality of portions for placing the works are rotated in a horizontal plane to thereby feed the work to the machine tool or remove it from the machine tool.

In any piece of the above-described related art, the plurality of work placement portions on which the works are to be laid are not arranged in the two stages in the vertical direction but in the horizontal plane. As a result, an apparatus for moving the work placement portions tends to be enlarged. In particular, in the case where the works having a large diameter are to be transferred, the work placement portions become large in physical size.

Also, a headstock of the machine tool moves in the X-axis direction to perform the operation to receive a work which has not been machined, after a work that has been machined is laid on the work placement portion within a work receiving/sending region. When the headstock performs the receiving/sending operation of the work, the distance of movement in the X-axis direction of the headstock tends to be elongated.

Thus, not only may an apparatus for transferring the work itself be enlarged but also it is necessary that the headstock be moved in the X-axis direction to perform the work receiving/sending operations, accordingly, this leads to an enlargement of the machine tool as a whole.

As a result, it is difficult to use in common the machine tool for machining the work having a large diameter and the machine tool for machining a standard size work. Also, as a result of the enlargement of the work transfer apparatus and the operation of movement of the headstock, it tends to take long time for changing the works.

SUMMARY OF THE INVENTION

In order to overcome the above-noted defects, an object of the present invention is to provide a work transfer method in a machine tool with a movable main spindle, an apparatus therefor and a machining system in which the work transfer apparatus for transferring a work is made compact to downsize the machine tool with the movable spindle as a whole, thereby reducing a work changing time.

In order to attain this and other object, according to the present invention, there is provided a work transfer method for transferring a work to a machine tool with a movable main spindle in which a headstock for rotatably supporting the main spindle moves at least in an axial direction of the spindle and in a direction perpendicular to an axis of the spindle, the work is transferred to the machine tool and is received/sent between a work transfer apparatus and a chuck provided at a lower end of the spindle, the method comprising the following steps of: disposing a machined work transfer portion for laying and transferring a machined work sent from the chuck on a machined work placement portion in an upper stage or a lower stage of a non-machined work transfer portion for laying and transferring a non-machined work for being receipt by the chuck on a non-machined work placement portion; moving the non-machined work placement portion between a non-machined work receiving position for the chuck to receive the non-machined work for machining the work in the machine tool and a work loading position for loading the non-machined work; and moving the machined work placement portion between a machined work sending position for the chuck to lay and send the machined work which has been machined by the machine tool, the machined work sending position being located in upper or lower position of the non-machined work receiving position, and a work unloading position for unloading the machined work, whereby the reception/release of the work is performed between the chuck and the apparatus for transferring the work.

In order to perform the above-described method, it is preferable to provide a work transfer apparatus for transferring a work to a machine tool with a movable main spindle in which a headstock for rotatably supporting the main spindle moves at least in an axial direction of the spindle and in a direction perpendicular to an axis of the spindle, and receiving/sending the work in cooperation with a chuck provided at a lower end of the spindle, the apparatus comprising: a work transfer apparatus base provided at a predetermined position in the vicinity of a machine body of the machine tool; a non-machined work transfer portion provided on the base for laying a non-machined work, which is to be received by the chuck, on a non-machined work placement portion and for transferring the non-machined work; and a machined work transfer portion provided on the base and disposed in an upper stage or a lower stage of the non-machined work transfer portion for laying a machined work, which has been sent from the chuck, on a machined work placement portion and for transferring the machined work, wherein the non-machined work placement portion of the non-machined work transfer portion moves between a non-machined work receiving position where the chuck receives the non-machined work to be machined by the machine tool and a work loading position where the non-machined work is loaded, and wherein the machined work placement portion of the machined work transfer portion moves between a machined work sending position, located above or below the non-machined work receiving position, where the chuck sends the machined work of which a machining operation is effected by the machine tool and a work unloading position where the machined work is unloaded, whereby the reception/release of the work is performed between the chuck and the apparatus for transferring the work.

In the above-described method and apparatus, it is also preferable that the non-machined work receiving position and the machined work sending position are located on a movement path of the headstock, and the movement path is directed in parallel with a direction perpendicular to the axis of the spindle.

Incidentally, it is preferable that the machined work transfer portion is located in the upper stage and the non-machined work transfer portion is located in the lower stage.

Also, preferably, the non-machined work transfer portion and the machined work transfer portion are provided on the base to be overlapped substantially with one on the other. The non-machined work placement portion and the machined work placement portion are moved in the same direction.

The machined work transfer portion is provided so as to straddle the non-machined work transfer portion upwardly and outwardly so that the non-machined work transfer portion and the machined work transfer portion do not interfere with each other and may transfer the non-machined work and the machined work independently, respectively.

Incidentally, the positions of the non-machined work transfer portion and the machined work transfer portion may be somewhat offset from each other by a predetermined distance in a moving direction of the headstock perpendicular to the axis of the spindle.

Also, the non-machined work transfer portion and the machined work transfer portion may be arranged to move in different directions.

Incidentally, the non-machined work transfer portion is located in the upper stage and the machined work transfer portion is located in the lower stage, and during the operation in which the chuck lays the machined work onto the machined work placement portion of the machined work transfer portion of the lower stage in the machined work sending position, the non-machined work transfer portion of the upper stage may be retracted to a retracted position.

In this case, it is possible to take an arrangement in which the non-machined work transfer portion and the machined work transfer portion are provided on the base to be overlapped substantially with one on the other. The non-machined work placement portion and the machined work placement portion are moved in the same direction.

Incidentally, the positions of the non-machined work transfer portion and the machined work transfer portion may be somewhat offset from each other by a predetermined distance in a moving direction of the headstock perpendicular to the axis of the spindle.

Also, the non-machined work transfer portion and the machined work transfer portion may be arranged to move in different directions.

Also, it is possible to take an arrangement in which either one of the transfer portions of the non-machined work transfer portion and the machined work transfer portion is provided on the base, and the other transfer portion is provided on the one transfer portion, and the non-machined work placement portion and the machined work placement portion are arranged to move in different directions.

It is preferable that at least one of the non-machined work placement portion and the machined work placement portion is moved up and down so that the chuck can grip the work.

It is preferable that the non-machined work receiving position and the machined work sending position have a common centerline directed vertically.

It is preferable that the work loading position and the work unloading position are arranged to be offset from each other so that changing of the works is possible without any interference between the non-machined work placement portion and the machined work placement portion.

Preferably, the non-machined work transfer portion comprises: a pair of guide rails mounted on the base in a direction in parallel with a longitudinal centerline of the work transfer apparatus; a non-machined work moving carrier reciprocating by the guidance of the guide rails; and a first driving means for reciprocating the non-machined work moving carrier. The non-machined work moving carrier comprises: a plurality of upper rollers mounted on both sides of the longitudinal centerline; and lower rollers arranged below and in the vicinity of the respective upper rollers, and is disposed between the pair of guide rails. The upper rollers and the lower rollers roll freely while the guide rail being sandwiched between the upper and lower rollers and while preventing the non-machined work moving carrier from moving up and down. Side rollers are mounted on both sides of the longitudinal centerline and are mounted on a front side and/or a rear side in a moving direction of the non-machined work moving carrier. These side rollers roll along opposite side surfaces of the guide rails so that the non-machined work moving carrier is prevented from moving in a horizontal direction perpendicular to the longitudinal centerline. The non-machined work placement portion is mounted in the horizontal direction on a top portion of the non-machined work moving carrier.

Preferably, the non-machined work transfer portion comprises a supporting device provided on the non-machined work moving carrier, and the supporting device has such a structure that the non-machined work placement portion is supported to be somewhat movable up and down and able to slant and the non-machined work placement portion is biased upwardly by a biasing member.

Preferably, the machined work transfer portion is located in the upper stage of the non-machined work transfer portion. The machined work transfer portion comprises: a pair of guide rails; a machined work moving carrier movable by the guidance of the guide rails; and a second driving means for reciprocating the machined work moving carrier. The pair of guide rails are mounted on the base in the direction parallel with the longitudinal centerline and are disposed outwardly and upwardly of the first-mentioned guide rails of the non-machined work transfer portion. The machined work moving carrier is formed in an inverted U-shaped in cross section so as to straddle the non-machined work moving carrier. The machined work moving carrier comprises: a plurality of upper rollers mounted on both sides of the longitudinal centerline; and lower rollers arranged below and in the vicinity of the respective upper rollers. The upper rollers and the lower rollers roll freely while the guide rail being sandwiched between the upper and lower rollers and while preventing the machined work moving carrier from moving up and down. Side rollers are mounted on both sides of the longitudinal centerline on a front side and/or a rear side in a moving direction of the machined work moving carrier. These side rollers roll along opposite side surfaces of the guide rails so that the machined work moving carrier is prevented from moving in a horizontal direction perpendicular to the longitudinal centerline. The machined work placement portion is mounted in the horizontal direction on a top portion of the machined work moving carrier.

Preferably, in the non-machined work transfer portion, stoppers which may adjust the position of the non-machined work moving carrier and may position the non-machined work placement portion in the non-machined work receiving position with high precision are provided on the base. In the machined work transfer portion, other stoppers which may adjust the position of the machined work moving carrier and may position the machined work placement portion in the machined work sending position with high precision are provided on the base. In the work loading position and the work unloading position, further other stoppers which position the non-machined work moving carrier and the machined work moving carrier, respectively, are mounted on the base.

Preferably, the work loading position and the work unloading position are set up to be overlapped with each other about the same center position in the vertical direction. When the machined work is removed from the machined work placement portion of the upper stage, the machined work moving carrier is retracted along the longitudinal centerline to expose the non-machined work moving carrier of the lower stage so that the non-machined work may be laid on the non-machined work placement portion substantially at the same position as the position where the work has been removed.

Preferably, the work transfer apparatus further comprises a machined work presence/absence detecting means for detecting whether or not an interfering object is laid on a top surface of the machined work placement portion when the machined work placement portion is positioned in the machined work sending position.

Furthermore, preferably, the work transfer apparatus comprises a non-machined work presence/absence detecting means for detecting whether or not the non-machined work is laid on a top surface of the non-machined work placement portion when the non-machined work placement portion is positioned in the non-machined work receiving position.

In a machining system according to the present invention, a plurality of machine tools with movable spindles are juxtaposed, and each machine tool and the adjacent machine tool are connected by the work transfer apparatus for transferring the work in order and the work is machined in the plurality of machine tools.

Preferably, in the machining system, the one work transfer apparatus in which the machined work transfer portion is arranged in an upper stage and the non-machined work transfer portion is arranged in a lower stage and another work transfer apparatus in which the non-machined work transfer portion is arranged in an upper stage and the machined work transfer portion is arranged in a lower stage are used in combined. The non-machined work transfer portion and the machined work transfer portion are arranged to be directed in different directions so that the machine tools are connected with each other by the work transfer apparatus.

In the machining system, it is preferable that a transfer loader for loading the work is provided at a work loading position and another transfer loader for unloading the work is provided at a work unloading position to thereby automatically load and unload the work.

With the above-described arrangements according to the present invention, it is possible to make the work transfer apparatus compact and to downsize the machine tool with the movable spindle as a whole, thereby reducing a work changing time.

BRIEF DESCRIPTION OF THE DRAWINGS

In the accompanying drawings:

FIGS. 1 to 9 are views showing embodiments of the present invention, FIG. 1 is an overall plan view of a vertical lathe with a movable spindle together with an apparatus for transferring a work;

FIG. 2 is an overall frontal view of FIG. 1;

FIG. 3 is a view as viewed in a direction III of FIG. 1 and is a side elevation view of the work transfer apparatus;

FIG. 4 is a plan view of FIG. 3;

FIG. 5 is a view as viewed in a direction V of FIG. 1 and is a frontal view of the work transfer apparatus;

FIG. 6 is an illustration of the operation of the work transfer apparatus;

FIG. 8A is a schematic plan view of a machining system according to the present invention;

FIG. 8B is a schematic plan view of FIG. 8A; and

FIG. 9 is a schematic view showing another machining system according to the invention.

PREFERRED EMBODIMENTS OF THE INVENTION

Embodiments of the present invention will now be described with reference to FIGS. 1 to 9.

In the embodiments, there is shown a vertical lathe as a machine tool with a movable main spindle to be numerically controlled by a numerical control (NC) device (not shown).

In this machine tool, a headstock for rotatably supporting the main spindle is moved at least in an axial direction of the spindle and in a direction perpendicular to the axial direction of the spindle to perform the operation of receiving/sending a work between a chuck provided at a lower end of the spindle and an apparatus for transferring the work. Also, the headstock may move between a work receiving/sending region and a machining region. If the machine tool is of this type, it is possible to apply the invention to any other machine tools such as a turning center, a grinding machine and a machining center. Namely, it is possible to apply the invention to the machine tool in which the headstock moves in three perpendicular axis directions.

Incidentally, although an axis of the spindle of the machine tool is directed in a vertical direction relative to a floor surface GL, the axis of the spindle may be changed to be slanted at a predetermined angle relative to the vertical direction.

Figure 1:
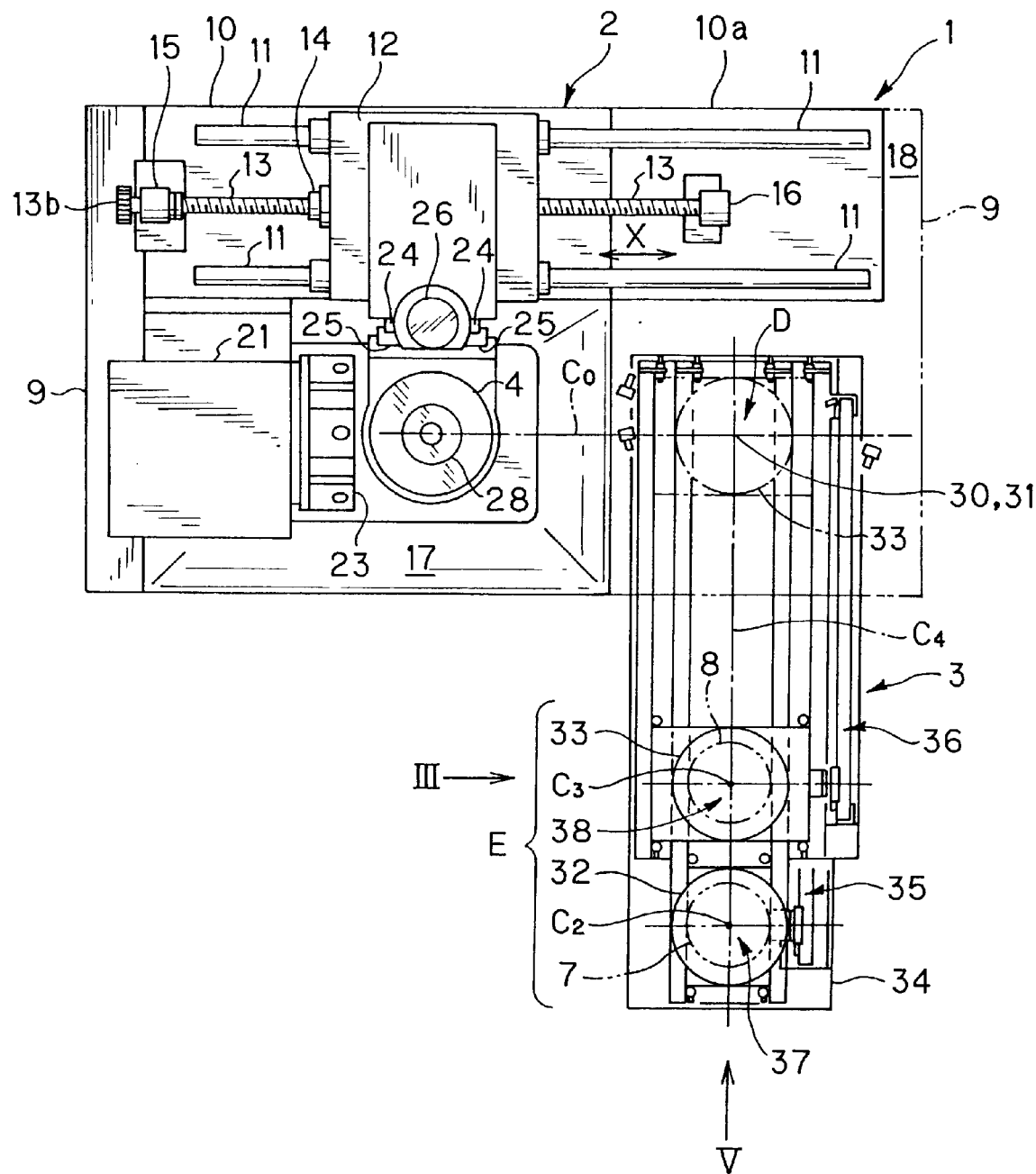
Figure 2:
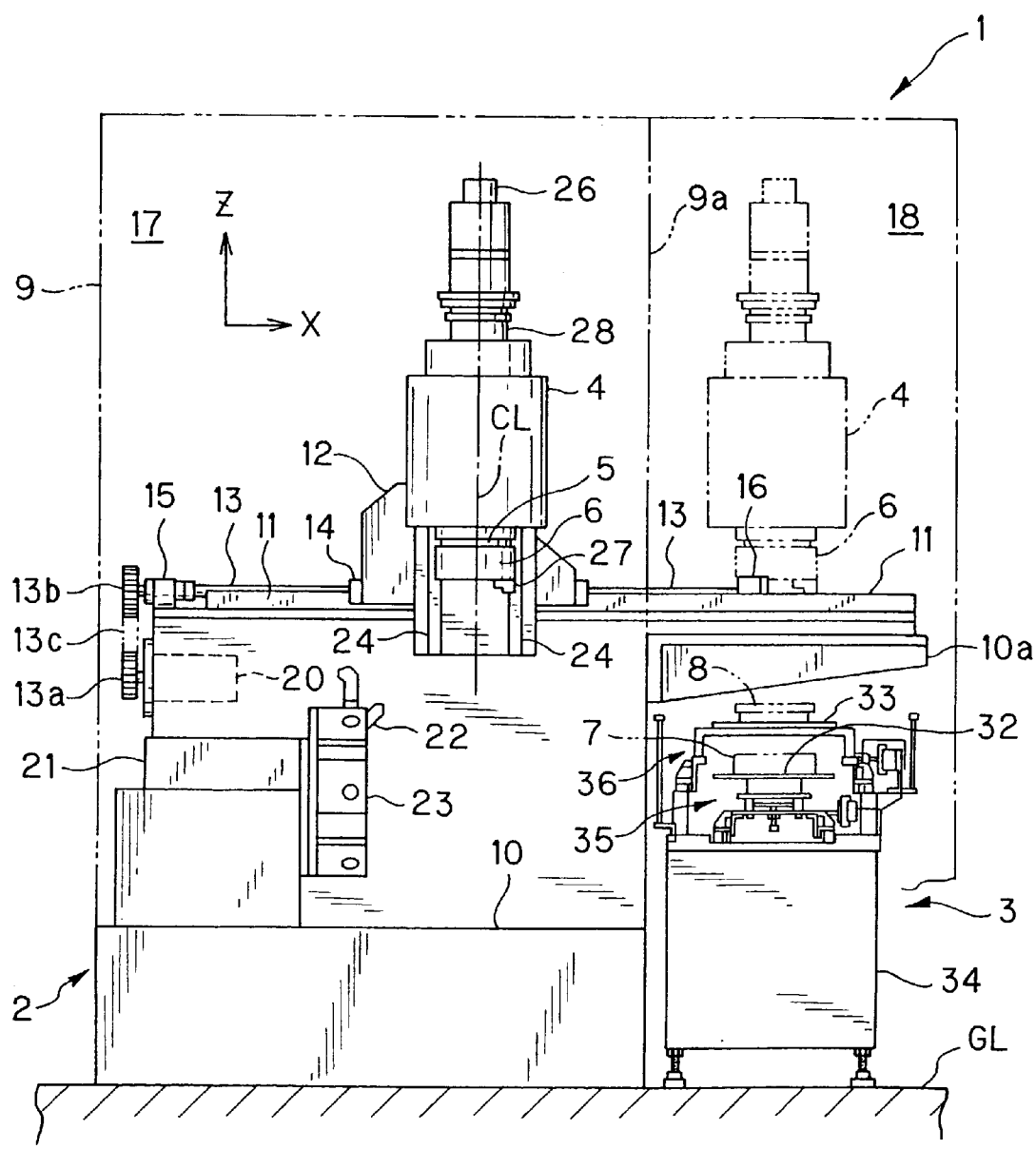

FIGS. 1 and 2 are an overall plan view and an overall frontal view of a vertical lathe with a movable spindle with a work transfer apparatus 3 for transferring a work, respectively.

The vertical lathe with the movable spindle (which will hereinafter be referred to as a lathe) 1 will first be described. As shown in FIGS. 1 and 2, the lathe 1 is provided with a machine body 2 and the work transfer apparatus 3 and is numerically controlled by an NC device. The work transfer apparatus 3 is provided in the vicinity of the machine body 2 for performing the operation to transfer the work to a predetermined position of the lathe 1.

In the lathe 1, movable members such as a headstock 4 and a main spindle 5 are moved in a Z-axis direction in parallel with an axial direction CL of the spindle 5. Also, the movable members move along a movement path $C_0$ between a position (hereinafter referred to as a machining position) where the work is machined within a machining region 17 and a work receiving/sending position D of the work transfer apparatus 3. The movement path $C_0$ is directed in parallel with an X-axis perpendicular to the Z-axis.

A chuck 6 directly grips a non-machined work (e.g. material work) 7 which has not yet been machined by the lathe 1 and receives the work 7 from the work transfer apparatus 3. Also, after the work has been machined at the machining position of the lathe 1, the chuck 6 opens to release the grip on a machined work 8 (e.g. final article) which has been machined and sends the machined work 8 to the work transfer apparatus 3.

In this type lathe 1 in which the headstock 4 including the spindle 5 is moved in the X-axis direction and in the Z-axis direction, a movement operation of the headstock 4 also serves to transfer the work.

A machining region 17 and a work receiving/sending (i.e., receiving and/or sending) region 18 are provided in the lathe 1. In the machining region 17, the work is machined at the machining position. This region 17 is covered by a splash guard 9 and a partitioning cover 9a.

The work receiving/sending region 18 is contiguous with the machining region 17. In this region 18, the works are sent and received between the chuck 6 and the work transfer apparatus 3. The headstock 4 is moved between both regions 17 and 18. The work receiving/sending region 18 is also covered by the splash guard 9 and the partitioning cover 9a. In the partitioning cover 9a, an opening portion (not shown) is provided for the movement of the headstock 4.

It is necessary to prevent cutting chips or coolant in the machining region 17 from splashing out of the opening portion at least when the work is machined in the machining region 17 by the headstock 4. For this purpose, other covers or the like are provided for a saddle 12, the headstock 4 or the like, or are provided between the saddle 12, the headstock 4 or the like and the partitioning cover 9a.

The work transfer apparatus 3 is disposed to the work receiving/sending region 18. The non-machined work 7 and the machined work 8 are received and sent between the work transfer apparatus 3 and the chuck 6. A part of the work transfer apparatus 3 (e.g. a part to the work receiving/sending position D) is located in the work receiving/sending region 18. The other part of the work transfer apparatus 3 is located in a region where the machined work 8 is removed and the non-machined work 7 is loaded by the worker.

In the work transfer apparatus 3, the work receiving/sending position D in the work receiving/sending region 18 and a work changing position E where the works are changed by the worker are set up. The work receiving/sending position D includes a non-machined work receiving position (hereinafter referred to as a receiving position) 30 located downwardly and a machined work sending position (hereinafter referred to as a sending position) 31 located upwardly. In the work receiving/sending position D, the receiving/sending operations of the non-machined work 7 and the machined work 8 are performed between the chuck 6 and the work transfer apparatus 3.

In the receiving position 30, in order for the lathe 1 to machine the work, a non-machined work pallet 32 to be used as a non-machined work placement portion (i.e., portion for placing the non-machined work 7) is positioned so as to face the chuck 6. Then, the non-machined work 7 laid on a top surface of the pallet 32 is gripped and received by a plurality of jaws of the chuck 6.

Also in the sending position 31 located above the receiving position 30, a machined work pallet 33 to be used as a machined work placement portion (i.e., portion for placing the machined work 8) is positioned so as to face the chuck 6.

In the sending position 31, the chuck 6 lays and sends the machined work 8, which has been machined by the lathe 1, onto the top surface of the pallet 33. Namely, the chuck 6 opens to release the grip on the machined work 8 at the sending position 31 and loads the machined work 8 onto the pallet 33.

For this reason, the receiving position 30 and the sending position 31 are located on the movement path $C_0$ of the headstock 4. The movement path $C_0$ is directed in parallel with a direction (X-axis direction) perpendicular to the axis CL of the spindle 5.

A pair of guide rails 11 are mounted in parallel on a top surface of a bed 10 of the lathe 1. The saddle 12 is disposed movably in the X-axis direction on the pair of guide rails 11 through sliding bodies (not shown). The guide rails 11 and the sliding bodies constitute a linear motion rolling guide.

A bracket 10a is fixed to the bed 10 in the direction of the work transfer apparatus 3. The guide rails 11 are supported by the bed 10 and the bracket 10a.

Incidentally, the bracket 10a may be formed integrally with the bed 10. Also, the guide rail 11 may be divided into two rails on the sides of the bed 10 and the bracket 10a which may be assembled into a single guide rail.

A screw shaft 13 of an X-axis ball screw is disposed in parallel with the guide rails 11 between the pair of guide rails 11. A nut 14 fixed to the saddle 12 is screwed around the screw shaft 13.

Both end portions of the screw shaft 13 are rotatably supported by bearing units 15 and 16 incorporating bearings. The screw shaft 13 is drivingly rotated forwardly and reversely by an X-axis servomotor 20 through toothed pulleys 13a and 13b and a toothed belt 13c. In this case, the X-axis servomotor 20 and the X-axis ball screw may be directly coupled by a coupler but may be drivingly rotated through a gear mechanism or the like.

When the screw shaft 13 is driven and rotated by the X-axis servomotor 20, the saddle 12 is guided along the guide rails 11 through the nut 14 and is moved with a reciprocating motion in the X-axis direction. This motion becomes a motion in the X-axis direction of the headstock 4 for tools 22.

In this lathe 1, a movable distance of the saddle 12 in the X-axis direction extends toward the work transfer apparatus 3.

A tool rest 21 is mounted on the bed 10. A turret 23 is provided to the tool rest 21 to make it possible to index a rotation about an axis in a predetermined direction, i.e., in parallel with the X-axis. A plurality of tools 22 are mounted radially on the turret 23.

A pair of Z-axis guide rails 24 are provided in parallel in the Z-axis direction on a front face of the saddle 12. The headstock 4 is engaged movably in the Z-axis direction with the pair of Z-axis guide rails 24 through sliding bodies 25.

The Z-axis guide rails 24 and the sliding bodies 25 constitute a linear motion rolling guide.

A Z-axis servomotor 26 is mounted on a top portion of the saddle 12. A screw shaft of a Z-axis ball screw (not shown) is coupled directly to the Z-axis servomotor 26 to be drivingly rotated.

A nut (not shown) fixed to the headstock 4 is screwed around the screw shaft of the Z-axis ball screw. Accordingly, when the screw shaft is rotated by the Z-axis servomotor 26, the headstock 4 is guided along the Z-axis guide rails 24 through the nut to be moved up and down in the Z-axis direction.

The driving power may be transmitted between the Z-axis servomotor 26 and the screw shaft of the Z-axis ball screw through a transmission mechanism such as a gear mechanism, a toothed pulley/toothed belt assembly and the like.

Incidentally, each guide portion may be, instead of the linear motion rolling guide, any other guide such as another rolling guide, a sliding guide and the like.

The spindle 5 is rotatably supported to the headstock 4 by a main bearing (not shown) and the like. The spindle 5 is rotated under the condition that the work is gripped by the chuck 6 provided at the lower end of the spindle 5. The spindle 5 is drivingly rotated by a built-in main motor (not shown) of the spindle incorporated into an interior of the headstock 4. The main motor of the spindle is preferably a built-in type but it may be of a type for driving the spindle through a transmission mechanism such as a gear mechanism, a belt/pulley mechanism and the like.

A plurality (for example, three) of jaws 27 are provided to the chuck 6 for gripping the work. A chuck cylinder 28 is provided on an upper portion of the spindle 5. By feeding fluid having a predetermined pressure and driving the chuck cylinder 28 thereby simultaneously opening/closing the jaws 27 radially, the work is gripped or released.

The operation of the lathe 1 will now be described.

When the lathe 1 performs the machining operation while receiving the non-machined work 7 in accordance with signals from the NC device, the X-axis servomotor 20 is driven to move the saddle 12 toward the work transfer apparatus 3 in the X-axis direction. By the movement of the saddle 12, the spindle 5 is moved along the movement path $C_0$ and then is located above the non-machined work receiving position 30 in the work receiving/sending position D of the work transfer apparatus 3.

Subsequently, the Z-axis servomotor 26 is driven so that the headstock 4 is moved to the receiving position 30 downwardly. The chuck cylinder 28 is driven to simultaneously move the jaws 27 of the chuck 6 in the gripping direction to directly grip the non-machined work 7 by the jaws 27. After the gripping operation of the chuck 6, the headstock 4 is moved up to a predetermined position.

Subsequently, the X-axis servomotor 20 is drivingly rotated so that the saddle 12 is moved to the machining position in the X-axis direction. By driving the Z-axis servomotor 26, the headstock 4 is moved in the Z-axis direction.

The turret 23 is turned to index a desired tool 22 mounted on the turret 23. Then, the main motor of the spindle is controlled so that the spindle 5 is rotated at predetermined rotational speeds and at the same time, the X-axis servomotor 20 and the Z-axis servomotor 26 are controlled. Thus, the non-machined work 7 is moved in the X-axis direction and in the Z-axis direction relative to the tool 22 to perform the cutting operation.

After the completion of the machining operation of the work, the X-axis servomotor 20 and the Z-axis servomotor 26 are driven. Thus, the headstock 4 is moved from the machining position to the machined work sending position 31 in the work receiving/sending position D. Then, the jaws 27 of the chuck 6 is moved in an opening direction, and the machined work 8 is released from the chuck 6 and is laid on the pallet 33 located at the sending position 31.

In the case where a next work is to be machined, the headstock 4 is slightly lifted up to a predetermined position (where the jaws and the work do not interfere with each other). After the pallet 33 located in the upper stage has been retracted from the sending position 31, the headstock 4 moves down to the receiving position 30 of the lower stage to grip the non-machined work 7, thus repeating the same operations as described above.

The work transfer apparatus 3 will now be described with reference to FIGS. 1 to 5.

Figure 3:
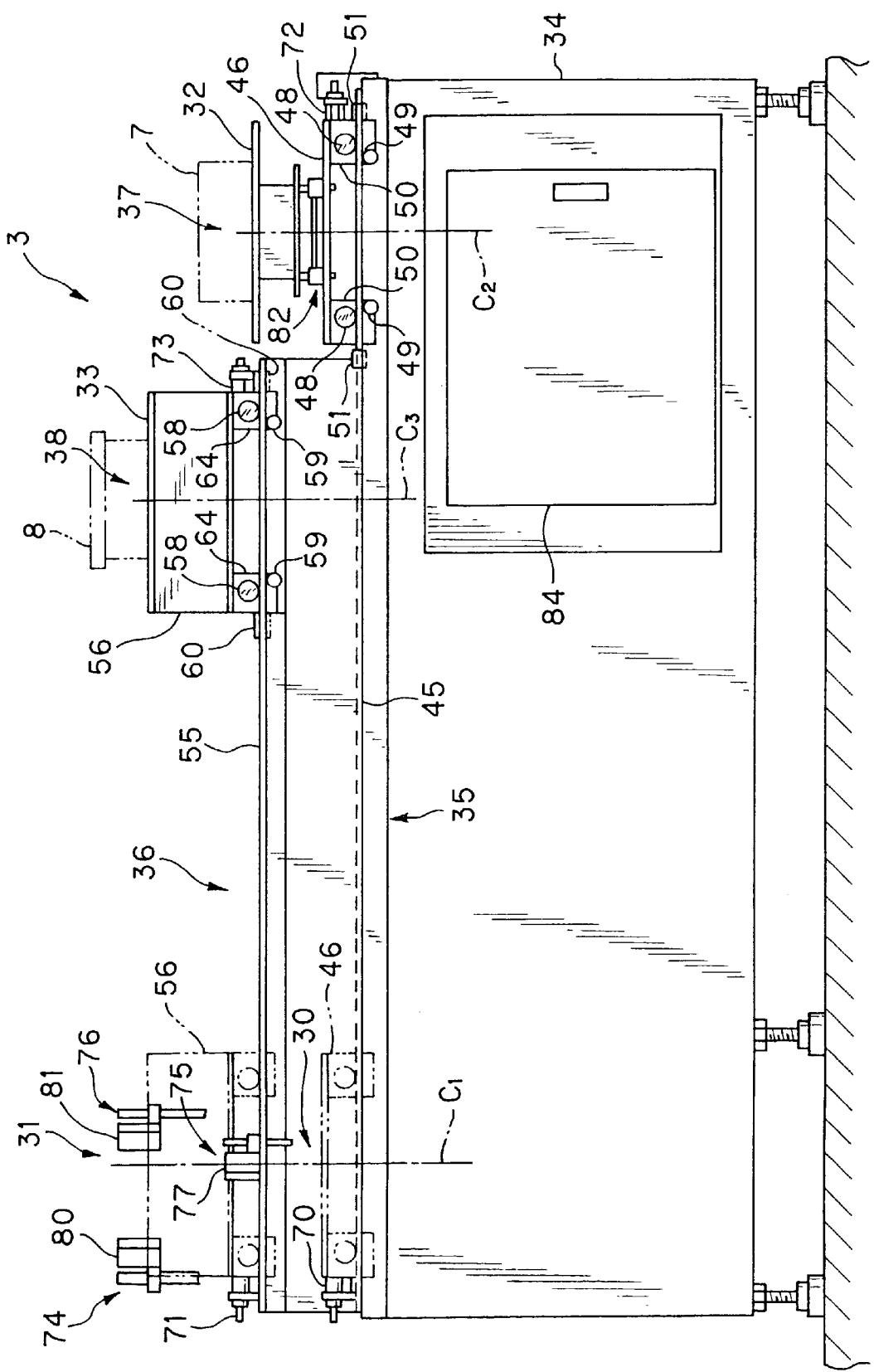
Figure 4:
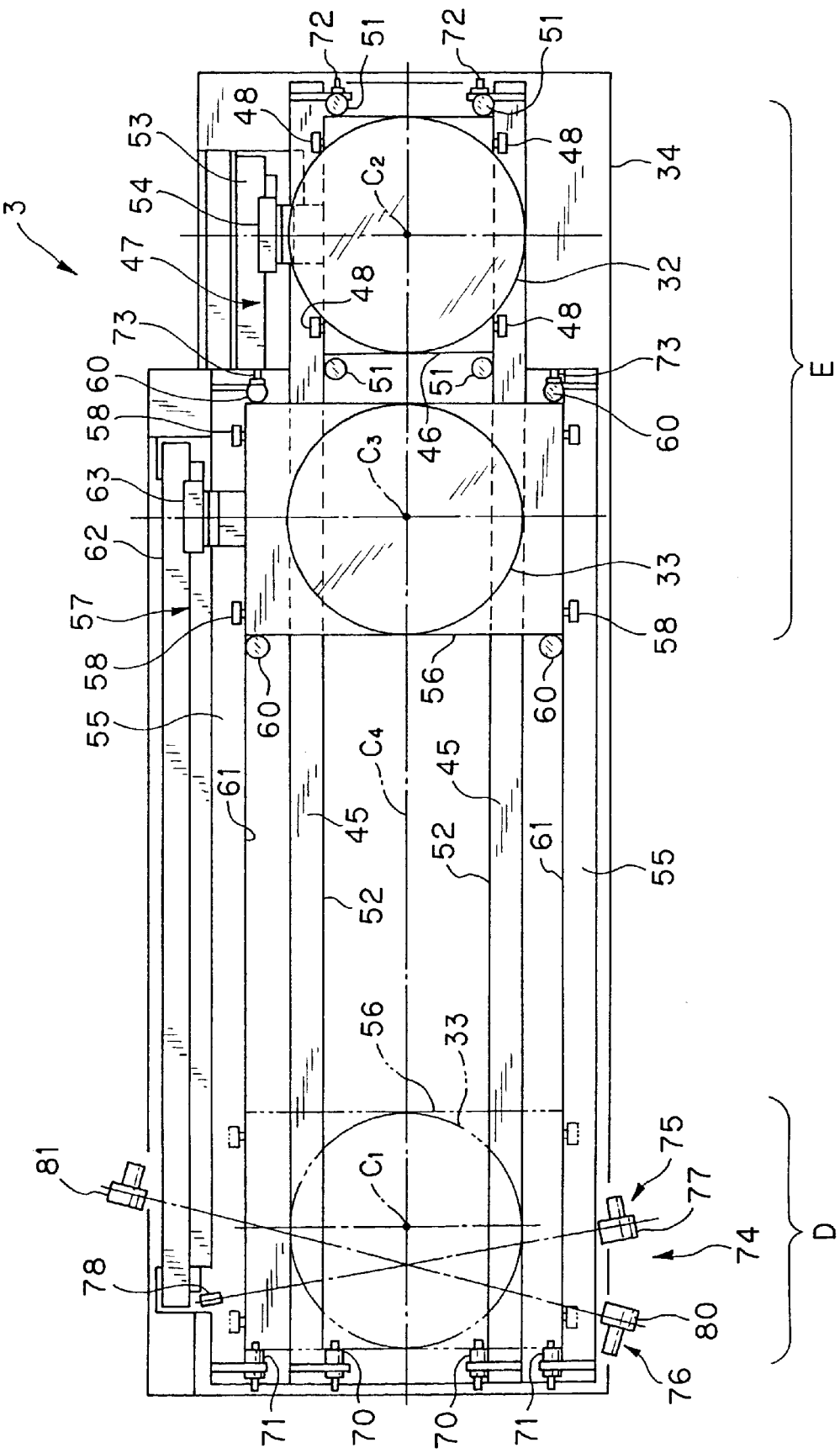
Figure 5:
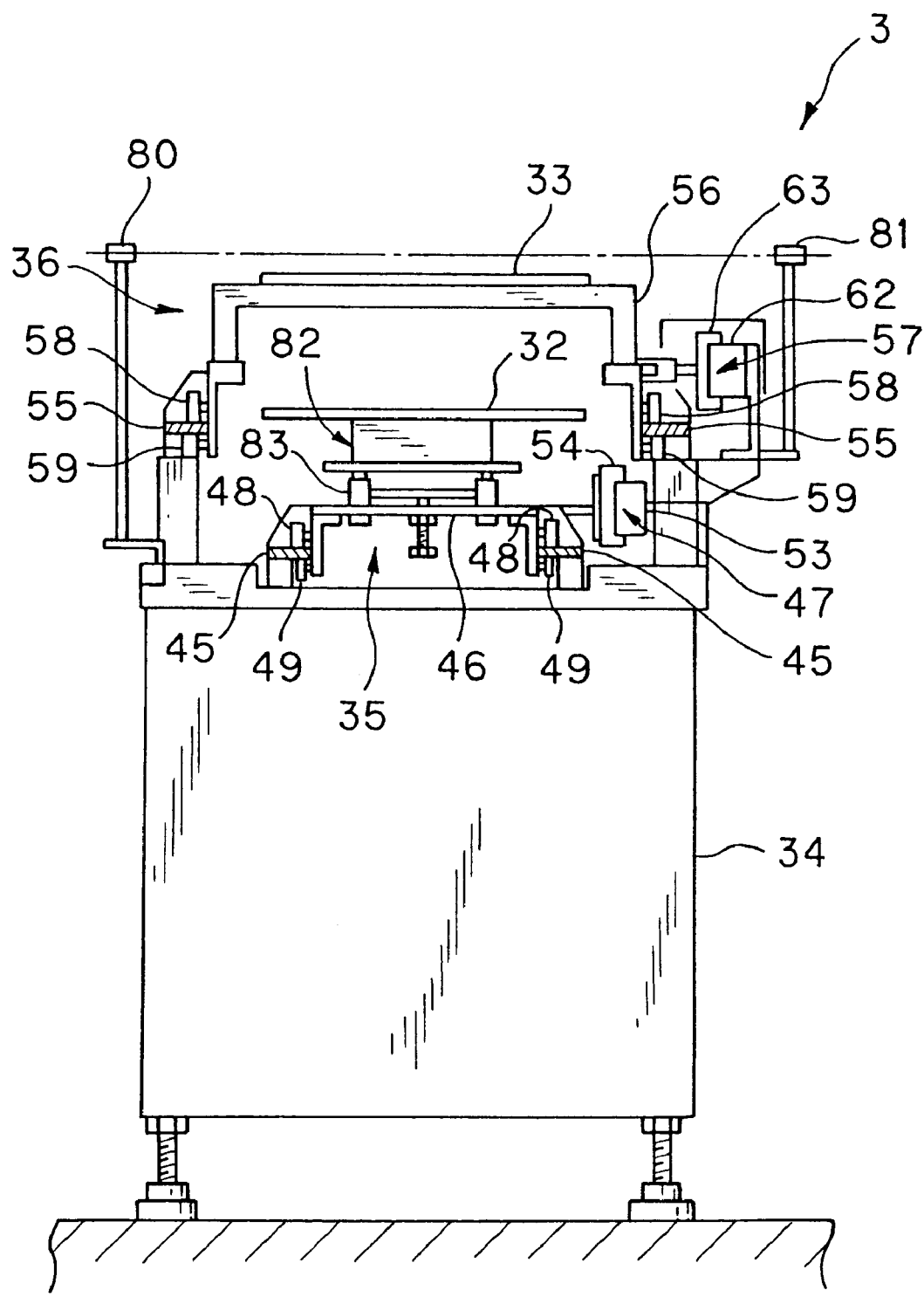

FIG. 3 is a side elevation view of the work transfer apparatus 3 as viewed in the direction III of FIG. 1, FIG. 4 is a plan view of the apparatus 3 shown in FIG. 3 and FIG. 5 is a frontal view of the work transfer apparatus 3 as viewed in the direction V of FIG. 1.

As shown in FIGS. 1 to 5, the work transfer apparatus 3 performs the operation of positioning, in order, the non-machined work 7 and the machined work 8 to predetermined positions (i.e., the receiving position 30 and the sending position 31), respectively.

The work transfer apparatus 3 is provided with a work transfer apparatus base (hereinafter referred to as a base) 34 installed at a predetermined position in the vicinity of the machine body 2 of the lathe 1. The base 34 is provided upright separately from the machine body 2.

Although the base 34 has to be provided in the predetermined position relative to the machine body 2, it may be formed integrally with or separately from the machine body 2. For example, the base 34 may be formed integrally with the bed 10 and/or the bracket 10a. Also, the base 34 that has been provided separately from the machine body 2 may be fixed directly or indirectly through a coupler to the bed 10 or the like.

The work transfer apparatus 3 is provided with a non-machined work transfer portion 35 and a machined work transfer portion 36 which are provided on the base 34.

The non-machined work transfer portion 35 lays the non-machined work 7, for being received by the chuck 6, on the pallet 32 and transfers the work 7 in. The machined work transfer portion 36 lays the machined work 8, sent from the chuck 6, on the pallet 33 and transfers the work 8 out.

A controlling and operating board 84 for controlling and operating the work transfer apparatus 3 is mounted on the base 34.

A longitudinal centerline $C_4$ of the work transfer apparatus 3 is in parallel with a direction perpendicular to the X-axis and to the Z-axis. The non-machined work pallet 32 and the machined work pallet 33 take reciprocating motions in a direction in parallel with the centerline $C_4$.

A work loading position 37 for transferring the non-machined work 7 in and a work unloading position 38 for transferring the machined work 8 out are set up in the work changing position E. The work loading position 37 and the work unloading position 38 are arranged in positions close to and away from the work receiving/sending position D.

Reversely, it is possible to locate the work loading position 37 to a position close to the work receiving/sending position D and to locate the work unloading position 38 to a position away therefrom.

In any case, the work loading position 37 and the work unloading position 38 are offset from each other in the direction of the centerline $C_4$. Accordingly, the non-machined work pallet 32 and the machined work pallet 33 do not interfere with each other and the change of the works may be performed smoothly by the worker.

In this embodiment, the non-machined work transfer portion 35 is arranged in the lower stage, whereas the machined work transfer portion 36 is arranged in the upper stage. In addition, the non-machined work transfer portion 35 and the machined work transfer portion 36 are substantially overlaid in the two-stage manner. Also, the non-machined work pallet 32 and the machined work pallet 33 are moved in the same direction (i.e., in the direction in parallel with the centerline $C_4$).

The machined work transfer portion 36 is arranged outwardly from the upper portion of the non-machined work transfer portion 35 so as to straddle the portion 35. Accordingly, there is no fear that the non-machined work transfer portion 35 and the machined work transfer portion 36 would interfere with each other. The non-machined work 7 and the machined work 8 may be transferred independently of each other.

Incidentally, as described later, it is possible to locate the machined work sending position 31 below the non-machined work receiving position 30 and to locate the machined work transfer portion 36 below the non-machined work transfer portion 35.

The pallet 32 is moved between the receiving position 30 where the non-machined work 7 to be machined by the lathe 1 is received by the chuck 6 and the work loading position 37. The other pallet 33 is moved between the sending position 31 where the machined work 8 that has been machined by the lathe 1 is laid and sent by the chuck 6 and the work unloading position 38.

The receiving position 30 is a predetermined position in the non-machined work transfer portion 35. The sending position 31 is the other predetermined position in the machined work transfer portion 36. The receiving position 30 located in the lower stage and the sending position 31 located in the upper stage have a common centerline $C_1$. This centerline $C_1$ is in parallel with the Z-axis and extends up and down.

The work loading position 37 having a centerline $C_2$ is a position in the non-machined work transfer portion 35 and the worker performs the loading operation of the non-machined work 7 in this position 37. The work unloading position 38 having a centerline $C_3$ is a position in the machined work transfer portion 36 and the worker performs the unloading operation of the machined work 8 in this position 38. The centerlines $C_2$ and $C_3$ extend up and down in parallel with the Z-axis.

The non-machined work transfer portion 35 is provided with a pair of guide rails 45, a non-machined work moving carrier 46 that reciprocates along the centerline $C_4$ by the guidance of the guide rails 45, and a first driving means 47 for drivingly reciprocating the moving carrier 46. The pair of guide rails 45 are mounted on the base 34 in the direction in parallel with the centerline $C_4$.

The moving carrier 46 is disposed between the pair of guide rails 45. The moving carrier 46 is provided with a plurality (four in total) of upper rollers 48 each pair of which are mounted on each side with respect to the centerline $C_4$, and lower rollers 49 arranged below the vicinity of each upper roller 48.

The upper roller 48 and the lower roller 49 are mounted on a supporting member 50 formed integrally with a lower side portion of the moving carrier 46. The rollers 48 and 49 roll freely while the guide rail 45 being sandwiched between the rollers 48 and 49 and while preventing the moving carrier 46 from moving up and down.

Pairs of side rollers 51 are mounted on both sides of the centerline $C_4$ on the front side (and/or the rear side) of the advancing direction of the moving carrier 46. The side rollers 51 roll on and along opposite side surfaces 52 of the guide rails 45. The side rollers 51 prevent the moving carrier 46 from moving in a horizontal direction perpendicular to the centerline $C_4$. The pallet 32 is mounted in the horizontal direction on a top portion of the moving carrier 46.

A first rodless cylinder is used as the first driving means 47. The first rodless cylinder 47 is provided with an elongated cylinder portion 53, which is arranged in parallel with the centerline $C_4$ and is mounted on the base 34, and a sliding portion 54 to be driven by the cylinder portion 53. The sliding portion 54 is mounted on a side surface of the moving carrier 46 to be slidingly movable along the cylinder portion 53.

The moving carrier 46 is thus driven by the cylinder portion 53 so that it slides in a direction in parallel with the centerline $C_4$ together with the sliding portion 54. Accordingly, the moving carrier 46 is moved with a reciprocating motion between the receiving position 30 and the work loading position 37.

The machined work transfer portion 36 is located in the upper stage of the non-machined work transfer portion 35. The machined work transfer portion 36 is provided with a pair of guide rails 55, a machined work moving carrier 56 that is movable in the direction in parallel with the centerline $C_4$ by the guidance of the guide rails 55, and a second driving means 57 for moving the moving carrier 56 with a reciprocating motion by driving the moving carrier 56. The pair of guide rails 55 are mounted on the base 34 in parallel with the centerline $C_4$ and are disposed outwardly upwardly of the pair of the guide rails 45.

The moving carrier 56 is formed into an inverted U-shaped in cross section so as to straddle the non-machined work moving carrier 46. The moving carrier 56 is provided with a plurality (four in total) of upper rollers 58 each pair of which are mounted on each side with respect to the centerline $C_4$, and a plurality (four in total) of lower rollers 59 arranged below the vicinity of each upper roller 58.

The upper roller 58 and the lower roller 59 are mounted on a supporting member 64 formed integrally with a lower side portion of the moving carrier 56. The rollers 58 and 59 roll freely while the guide rail 55 being sandwiched between the rollers 58 and 59 and while preventing the moving carrier 56 from moving up and down.

Pairs of side rollers 60 are mounted on both sides of the centerline $C_4$ on the front side (and/or the rear side) of the advancing direction of the moving carrier 56. The pair of side rollers 60 roll on and along the opposite side surfaces 61 of the pair of guide rails 55. The side rollers 60 prevent the moving carrier 56 from moving in the horizontal direction perpendicular to the centerline $C_4$. The pallet 33 is mounted in the horizontal direction on a top portion of the moving carrier 56.

Incidentally, the explanation of the guide portions has been made as to the guide rails 45 and 55, the upper rollers 48 and 58, the lower rollers 49 and 59 and the side rollers 51 and 60. However, it is possible to use any other guide such as a rolling guide (for example, a linear motion rolling guide) and a sliding guide.

A second rodless cylinder having the same structure as that of the first rodless cylinder 47 is used as the second driving means 57. The second rodless cylinder 57 is provided with a cylinder portion 62 and a sliding portion 63 to be driven by the cylinder portion 62.

The cylinder portion 62 is mounted on the base 34 in parallel with the centerline $C_4$. The sliding portion 63 is mounted on the a side portion of the moving carrier 56. If the cylinder portion 62 is driven, the moving carrier 56 is moved in a direction in parallel with the centerline $C_4$ together with the sliding portion 63. Accordingly, the moving carrier 56 is moved with a reciprocating motion between the sending position 31 and the work unloading position 38.

In the first and second rodless cylinders 47 and 57, the sliding portions 54 and 63 are moved by feeding cylinder chambers of the cylinder portions 53 and 62 with pressurized fluid (e.g. compressed air) to thereby move pistons therein.

The first and second rodless cylinders 47 and 57 are of a magnet type or a mechanical joint type. However, it is possible to use any type mechanism. Incidentally, instead of the first and second rodless cylinders 47 and 57, it is possible to use, as the first and second driving means, cylinders having rods. Also, it is possible to use driving means which are constituted by driving motors and cylinders having rods in combination with screw mechanisms, rack and pinion mechanism, chain and sprocket mechanisms or toothed belt and toothed pulley mechanisms.

Incidentally, the work loading position 37 and the work unloading position 38 may be set up at the same central position in the vertical direction. In this case, the machined work 8 is to be removed from the upper pallet 33 by the worker. Then, the worker depresses the operational button to input the signal representative of the completion of the removal of the machined work.

Then, the machined work moving carrier 56 of the upper stage is retracted in any direction along the centerline $C_4$ to expose the non-machined work moving carrier 46 of the lower stage. The worker may lay the non-machined work 7 on the pallet 32 substantially at the same position as that of the above-described removal position.

With such an arrangement, it is possible for the worker to change the works substantially at the same position without the need for the worker to move laterally. Also, this arrangement is effective particularly for the case where the works are loaded or unloaded by suspending the works with a transferring means such as a transfer loader, a chain block and a crane.

Namely, since the transfer loader may always load and unload the works at the same position, this is effective in the case where the transferring system of the works is automated or the works are heavy in weight. The crane or the like is effective in the case where the works are heavy in weight.

A pair of stoppers 70 are mounted on the base 34 in the direction of the work receiving/sending region 18 in the non-machined work transfer portion 35. The stoppers 70 are provided on both sides of the centerline $C_4$ for positioning the moving carrier 46 at the receiving position 30 with high precision.

If the stoppers 70 may be adjusted by screws or the like, in the receiving position 30, it is possible to adjust the position of the moving carrier 46 so that the center of the pallet 32 is identified with the centerline $C_1$ of the receiving position 30.

On the machined work transfer portion 36, another pair of stoppers 71 having the same structure as that of the above-described stoppers 70 are mounted on the base 34. The pair of stoppers 71 are provided on both sides of the centerline $C_4$ to make it possible to position the moving carrier 56 at the sending position 31.

By adjusting screws or the like of the stoppers 71, it is possible to adjust the position of the moving carrier 56 so that the center of the pallet 33 is identified with the centerline $C_1$ of the sending position 31 in the sending position 31. Incidentally, it is possible to take an arrangement in which the single stopper 70 and the single stopper 71 are provided.

Thus, it is possible to the non-machined work pallet 32 and the machined work pallet 33 at the centerline $C_1$ with high precision by the stoppers 70 and 71. It is therefore possible to correctly perform the work receiving/sending operation by the chuck 6 in the work receiving/sending position D.

Furthermore, other pairs of stoppers 72 and 73 are mounted on the base 34 in the work loading position 37 and in the work unloading position 38, respectively. The stoppers 72 and 73 are used for positioning the non-machined work moving carrier 46 and the machined work moving carrier 56, respectively.

The moving carriers 46 and 56 are firmly positioned and retained at the work changing position E by these stoppers 72 and 73 and the first and second rodless cylinders 47 and 57. It is therefore possible for the worker to perform the changing operation and preparation operation of the works in safety.

Incidentally, the work loading position 37 and the work unloading position 38 may be at ends of movement strokes of the first and second rodless cylinders 47 and 57, respectively.

The work presence/absence detecting means 74 will now be described.

The work present/absence detecting means 74 is provided in the work transfer apparatus 3. This detecting means 74 detects whether the work or the like is laid on the work placement portion (i.e., the non-machined work pallet 32 or the machined work pallet 33) when the work placement portion is positioned at a predetermined position (i.e., the receiving position 30 or the sending position 31). This detecting means 74 is constituted by a non-machined work presence/absence detecting means 75 and a machined work presence/absence detecting means 76.

A photoelectric sensor of a transmission type is used as the non-machined work presence/absence detecting means 75. The non-machined work photoelectric sensor (non-machined work presence/absence detecting means) 75 is provided with a photo emitter 77 and a photo receiver 78 which are mounted on the base 34.

The sensor 75 detects whether or not the non-machined work 7 is loaded on the top surface of the pallet 32 when the pallet 32 is positioned at the receiving position 30.

A photoelectric sensor of a transmission type is also used as the machined work presence/absence detecting means 76. The machined work photoelectric sensor (machined work presence/absence detecting means) 76 is provided with a photo emitter 80 and a photo receiver 81 which are mounted on the base 34.

The sensor 76 detects whether or not an interfering object is loaded on the top surface of the pallet 33 when the pallet 33 is positioned at the machined work sending position 31.

This interfering object is the machined work 8 sent to the pallet 33 by the receiving/sending operation of the chuck 6 and includes the non-machined work 7 or the like laid on the machined work pallet 33 erroneously when the worker performs the work changing operation.

The presence/absence of the non-machined work 7 is detected by projecting a beam from the photo emitter 77 to the photo receiver 78. The presence/absence of the interfering object such as the machined work 8 is detected by projecting a beam from the photo emitter 80 to the photo receiver 81.

Incidentally, each of the photoelectric sensors 75 and 76 may be of a feedback reflective type or a diffusion reflective type in addition of the transmission type. Also, each of the sensors 75 and 76 may be of a non-contact type or a contact type which may judge the presence/absence of an object. For instance, it may be a photo sensor such as a laser beam sensor, an ultrasonic wave sensor, a magnetic sensor, a limit switch and the like.

If the headstock 4 is moved from the machining region 17 to the work receiving/sending region 18 and the work is laid on the pallet 33 in the sending position 31 when the sensor 76 outputs a signal representative of the fact that the machined work 8 (interfering object) is laid on the pallet 33 in the sending position 31, there is a fear that the machined work 8 gripped by the chuck 6 and the machined work 8 on the pallet 33 collide with each other.

Accordingly, one of the conditions that the headstock 4 may be moved to the sending position 31 and may send the machined work 8 is that the sensor 76 outputs a signal representing that any interfering object such as the machined work 8 is not laid.

Namely, while the sensor 76 outputs a signal representing that there is the machined work 8, an interlock is provided so that the headstock 4 is prevented from moving to the work receiving/sending region 18 and from sending the machined work 8 to the pallet 33 in the sending position 31. Thus, it is possible to prevent the collision.

The non-machined work photo sensor 75 is provided for the purpose of preventing an idle machining operation by the lathe 1. In the case where the sensor 75 outputs a signal representing that the non-machined work 7 is laid on the pallet 32 in the receiving position 30, the headstock 4 is moved to the receiving position 30 to grip the non-machined work 7.

Accordingly, the gripping operation of the chuck 6 is not carried out at the receiving position 30 under the condition that the non-machined work 7 is not provided. The idle machining operation may be prevented. Incidentally, the non-machined work photo sensor 75 may be dispensed with.

A supporting device 82 is provided on the non-machined work moving carrier 46. The supporting device 82 is disposed on the lower portion of the pallet 32. The supporting device 82 supports the pallet 32 to be slightly movable up and down and able to slant and at the same time urges the pallet 32 upwardly (for example, toward the chuck 6 in the centerline $C_1$) by a biasing member 83 such as a spring.

Thus, under the non-machined work 7 is depressed to the chuck 6 at a predetermined load, it is possible to perform the reception/release of the non-machined work 7 smoothly. Also, even if the non-machined works 7 are different in thickness, it is possible to firmly grip them by the chuck 6.

Also, since a sensor (not shown) for preventing an excessive depression is provided, in the case where the work is excessively depressed, it is possible to stop the motion of the headstock 4 or the like by alarms to prevent the apparatus 3 from being damaged.

Incidentally, although the supporting device 82 is provided only on the non-machined work moving carrier 46, it is possible to provide another supporting device onto the machined work moving carrier 56. If this is provided, when the machined work 8 is sent from the chuck 6 to the pallet 33 of the moving carrier 56, it is possible to smoothly lay the machined work 8 without any collision or drop onto the pallet 33. As a result, it is possible to prevent the machined work 8 from being damaged.

Figure 6:
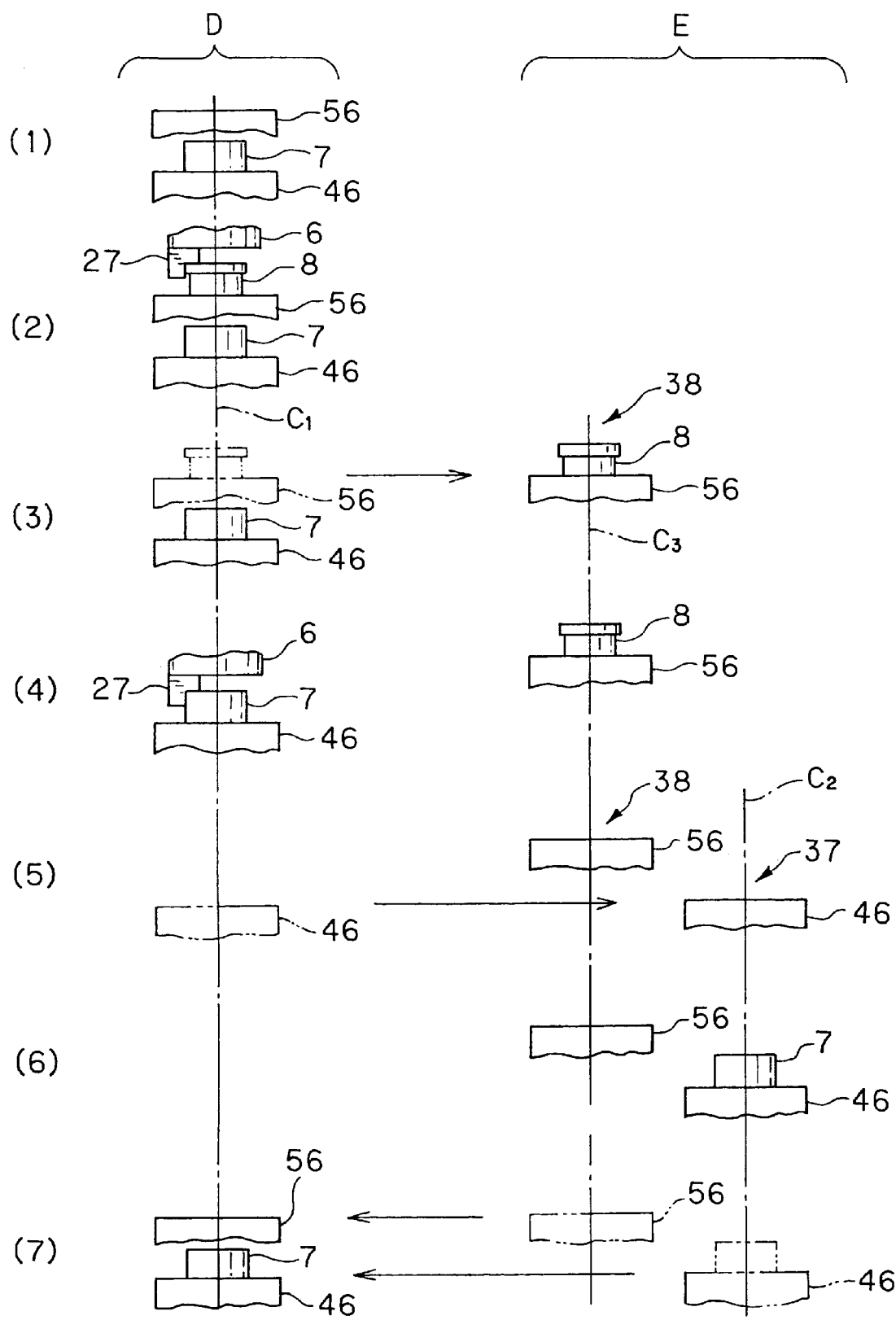

The operation of the lathe 1 and the work transfer apparatus 3 as a whole will now be described with reference to FIGS. 1 to 6. FIG. 6 is an illustration of the operation of the work transfer apparatus 3.

As shown in FIG. 6(1), in the initial stage, it is assumed that the non-machined work 7 is laid on the non-machined work moving carrier 46 which has been positioned in the work receiving/sending position D in advance, and the machined work moving carrier 56 located just above the moving carrier 46 is empty.

On the other hand, in the lathe 1, the spindle 5 in which the work is gripped by the chuck 6 is drivingly rotated by the main motor of the spindle. The X-axis servomotor 20 and the Z-axis servomotor 26 are controlled and at the same time the rotational speeds of the spindle 5 are controlled. Thus, the work is cut and machined by the tool 22.

After the completion of the machining work, a moving command that the headstock 4 is moved from the machining region 17 to the work receiving/sending region 18 is outputted. The sensor 76 detects whether or not the interfering object such as the machined work 8 is laid on the pallet 33 in the sending position 31, and outputs a signal representing that no interfering object is laid.

Also, in accordance with the movement signal of the first and second rodless cylinders 47 and 57, it is confirmed that the non-machined work moving carrier 46 and the machined work moving carrier 56 are positioned in the work receiving/sending position D.

Only when these two conditions are met, the headstock 4 is moved to the work receiving/sending region 18 to perform the reception/sending of the work. Furthermore, the non-machined work 7 is positioned on the moving carrier 46 and in the receiving position 30 where the chuck 6 is ready for gripping. Also, the sensor 75 outputs the signal representing that the non-machined work 7 is laid on the receiving position 30.

When the headstock 4 has arrived above the work receiving/sending position D and the centerline CL of the spindle is identified with the centerline $C_1$, as shown in FIG. 6(2), the headstock 4 is moved down. Then, the machined work 8 is laid on the pallet 33 of the moving carrier 56. Subsequently, the jaws 27 of the chuck 6 are moved in the opening direction to release and send the machined work 8.

Subsequently, the headstock 4 is slightly raised up to a predetermined level where the machined work 8 and the jaws 27 of the chuck 6 do not interfere with each other. Thereafter, as shown in FIG. 6(3), the second rodless cylinder 57 is driven so that the machined work moving carrier 56 is moved from the work receiving/sending position D to the work unloading position 38.

Subsequently, as shown in FIG. 6(4), the headstock 4 is moved down along the centerline $C_1$. Then, the non-machined work 7 laid on the pallet 32 of the moving carrier 46 is gripped by the jaws 27 of the chuck 6.

At this time, since the non-machined work 7 on the pallet 32 is kept under the condition that the work 7 is depressed by a predetermined biasing force in the Z-axis direction to the jaws 27 of the chuck 6 by the biasing member 83, the work 7 is firmly gripped by the jaws 27. After the gripping of the non-machined work 7 with the chuck 6, the headstock 4 is raised at a predetermined level. Thereafter, the headstock 4 moves from the work receiving/sending region 18 to the machining region 17 to start cutting the non-machined work 7.

When the machined work moving carrier 56 has moved to the work unloading position 38, it is positioned and maintained by the second rodless cylinder 57 and the stoppers 73. Accordingly, the worker removes the machined work 8 away from the moving carrier 56 in the work unloading position 38.

On the other hand, as shown in FIG. 6(5), the non-machined work 7 is gripped by the chuck 6 and the headstock 4 is raised. Subsequently, the first rodless cylinder 47 is driven so that the non-machined work moving carrier 46 is moved from the work receiving/sending position D to the work loading position 37.

Then, the non-machined work moving carrier 46 is positioned and maintained to the work loading position 37 by the first rodless cylinder 47 and the stoppers 72. As shown in FIG. 6(6), the worker lays a new non-machined work 7 to be machined on the pallet 32 of the moving carrier 46.

Thus, while the headstock 4 is moved away from the work transfer apparatus 3 and performs the machining operation, the worker does the changing operation of the works. Namely, the worker removes the machined work 8 away from the pallet 33 and lays the non-machined work 7 on the pallet 32 in the work changing position E.

When the work change has been completed, the worker depresses the button of the operating board 84 to input a signal of a preparation (i.e., work setup) completion. When this signal is inputted, as shown in FIG. 6(7), the first and second rodless cylinders 47 and 57 are driven, and the non-machined work moving carrier 46 and the machined work moving carrier 56 are moved from the work changing position E to the work receiving/sending position D, respectively.

Thus, the non-machined work moving carrier 46 and the machined work moving carrier 56 are maintained by the first and second rodless cylinders 47 and 57 and the stoppers 70 and 71 in the work receiving/sending position D, respectively. Accordingly, the moving carriers 46 and 56 are positioned centering about the common centerline $C_1$ in the lower receiving position 30 and the sending position 31 just above the lower receiving position 30.

This condition has just returned back to the initial condition shown in FIG. 6(1). Accordingly, the work transfer apparatus 3 waits for the reception and release of the machined work 8 and the non-machined work 7 in cooperation with the chuck 6 while the headstock 4 is moved to the work receiving/sending position D after the completion of the machining work of the lathe 1.

In this embodiment, the machined work transfer portion 36 is arranged on the upper stage and the non-machined work transfer portion 35 is arranged on the lower stage. As a result, in the work receiving/sending position D, after the chuck 6 has sent the machined work 8 to the moving carrier 56 in the upper stage, the chuck 6 is moved downwardly to receive the non-machined work 7 from the moving carrier 46. Accordingly, the headstock 4 moves through a minimum distance and there is no waste movement. It is possible to perform the reception and release of the work for a short period of time.

FIGS. 7A to 7E are illustrations of work transfer apparatus showing a variety of modifications to the above-described embodiment.

In the foregoing explanation, the arrangement has been described in which the non-machined work transfer portion 35 and the machined work transfer portion 36 are substantially overlapped with one on the other. Incidentally, as in the work transfer apparatus 3 shown in FIG. 7A, the non-machined work transfer portion 35 and the machined work transfer portion 36 are arranged in a two-stage manner and may move in different directions (for example, reverse with 180 degrees or difference with 90 degrees).

This modification is suitable for the case where the work loading position 37 and the work unloading position 38 are remarkably different. Also, in a machining system provided with a plurality of machine tools, it is possible to transfer the work from one machine tool to another adjacent machine tool by the work transfer apparatus 3.

Also, it is possible to change the transfer directions so that the work loading position 37 and the work unloading position 38 are not overlapped. Namely, in the work changing position, it is possible to change the transfer directions so that the non-machined work pallet 32 and the machined work pallet 33 are not overlapped.

Figure 7A:
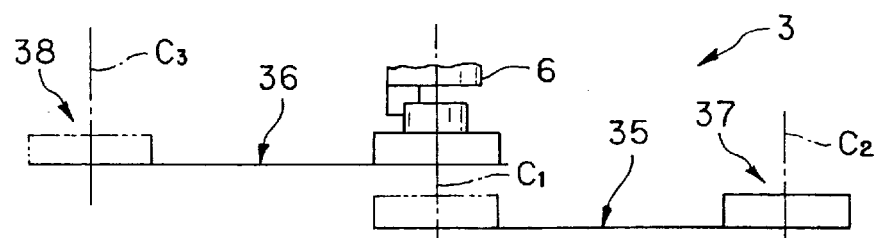
FIG. 7A is an illustration of the work transfer apparatus showing a modification to the embodiment.
Figure 7B:
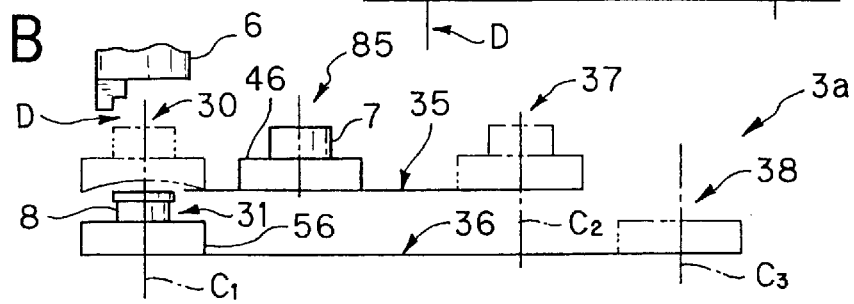
FIG. 7B is an illustration of the work transfer apparatus showing another modification to the embodiment.

In a work transfer apparatus 3a as another modification, as shown in FIG. 7B, it is possible to arrange the non-machined work transfer portion 35 in the upper stage and to arrange the machined work transfer portion 36 in the lower stage. The other structure of this work transfer apparatus 3a is the same as that of the above-described work transfer apparatus 3.

In this case, during the operation of laying the machined work 8 on the pallet 33 of the machined work transfer portion 36 in the lower stage by the chuck 6 in the sending position 31, the moving carrier 46 of the non-machined work transfer portion 35 in the upper stage is retracted to a predetermined retracted position 85. This retracted position 85 may be the work loading position 37.

Also, if a machine tool in which a headstock may move in the perpendicular three-axis coordinate is used, the headstock may move in a direction (Y-axis direction) perpendicular to the X-axis and the Z-axis. Accordingly, the non-machined work receiving position and the machined work sending portion are offset from each other in the Y-axis direction and the headstock may move in the Y-axis direction.

In this case, the above-described receiving position and the sending portion are located on the movement path of the headstock. This movement path is directed in parallel with the direction (Y-axis direction) perpendicular to the axis CL of the spindle.

With such an arrangement, even if the non-machined work transfer portion 35 and the machined work transfer portion 36 are arranged in the upper stage and in the lower stage, respectively, it is unnecessary to provide the retracted position.

It is possible to combine the structure of this work transfer apparatus 3a with the structure of the above-described work transfer apparatus 3. For instance, the work transfer apparatus 3a and the work transfer apparatus 3 shown in FIG. 7A are combined with each other. Then, if the non-machined work transfer portion 35 and the machined work transfer portion 36 are arranged in different directions (for instance, reverse direction with 180 degrees or difference with 90 degrees), it is possible to apply the work transfer apparatus to a machining system (see FIGS. 8A, 8B and 9).

Figure 7C:
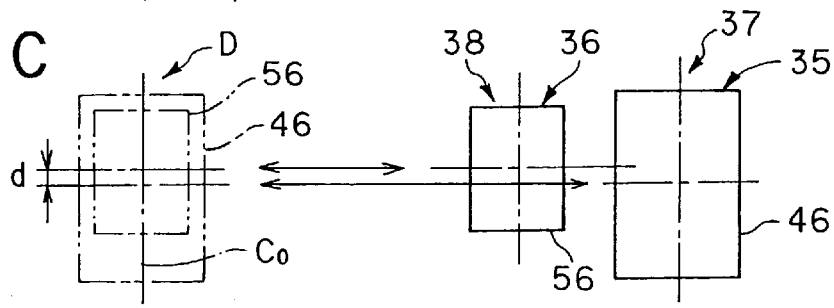
FIG. 7C is an illustration of the work transfer apparatus showing still another modification to the embodiment.

In still another modifications of the work transfer apparatus 3 and 3a, as shown in FIG. 7C, the positions of the non-machined work transfer portion 35 and the machined work transfer portion 36 are offset by a predetermined distance d in the moving direction (i.e., direction of the movement path $C_0$) of the headstock 4. The moving direction is perpendicular to the axis CL of the spindle.

Figure 7D:
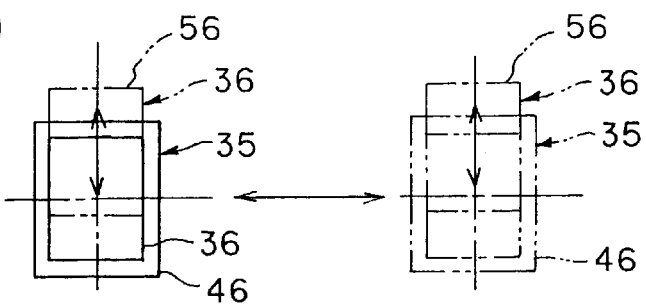
FIG. 7D is an illustration of the work transfer apparatus showing still another modification to the embodiment.

In still another modification, as shown in FIG. 7D, either one of the transfer portions of the non-machined work transfer portion 35 and the machined work transfer portion 36 is provided on the base 34, and the other transfer portion is provided on above-described one transfer portion.

Then, the pallet 32 of the non-machined work moving carrier 46 and the pallet 33 of the machined work moving carrier 56 are moved in different directions (i.e., difference with 90 degrees) each other.

Figure 7E:
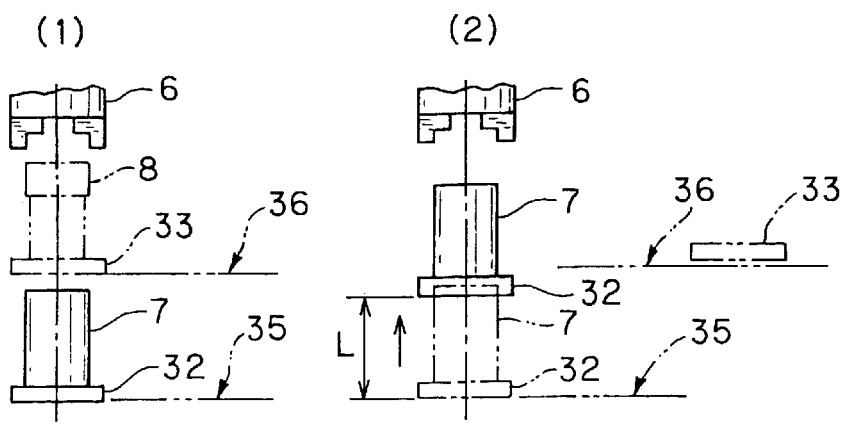
FIG. 7E is an illustration of the work transfer apparatus showing still another modification to the embodiment.

By the way, in the case where a dimension in the axial direction of the works 7 and 8 as shown in FIG. 7E(1), it is necessary to locate the pallets 32 and 33 at low positions away from the chuck 6. For this reason, in some cases, the chuck 6 may not grip the work 7 on the pallet located downwardly (i.e., the pallet 32) with a movement stroke in the vertical direction of the headstock 4.

Therefore, if the pallet 32 is moved up and down in a range of a predetermined movement stroke L as shown in FIG. 7E(2), it is possible to grip the work 7 by the chuck 6. With such an arrangement, even if the movement stroke of the headstock 4 is not prolonged, it is possible to receive and send the works 7 and 8 with a long axial dimension by the chuck 6.

In FIG. 7E, at least one of the non-machined work pallet 32 and the machined work pallet 33 is moved up and down by an elevator mechanism so that the work 7, 8 may be gripped by the chuck 6.

In this case, it is possible to elevate only the pallet 32 and/or 33 but to move up and down the non-machined work moving carrier 46 and/or the machined work moving carrier 56. This structure is preferably applied to the structure for the work receiving/sending position D but it is possible to apply it to the structure for the work changing position E.

Figure 9:
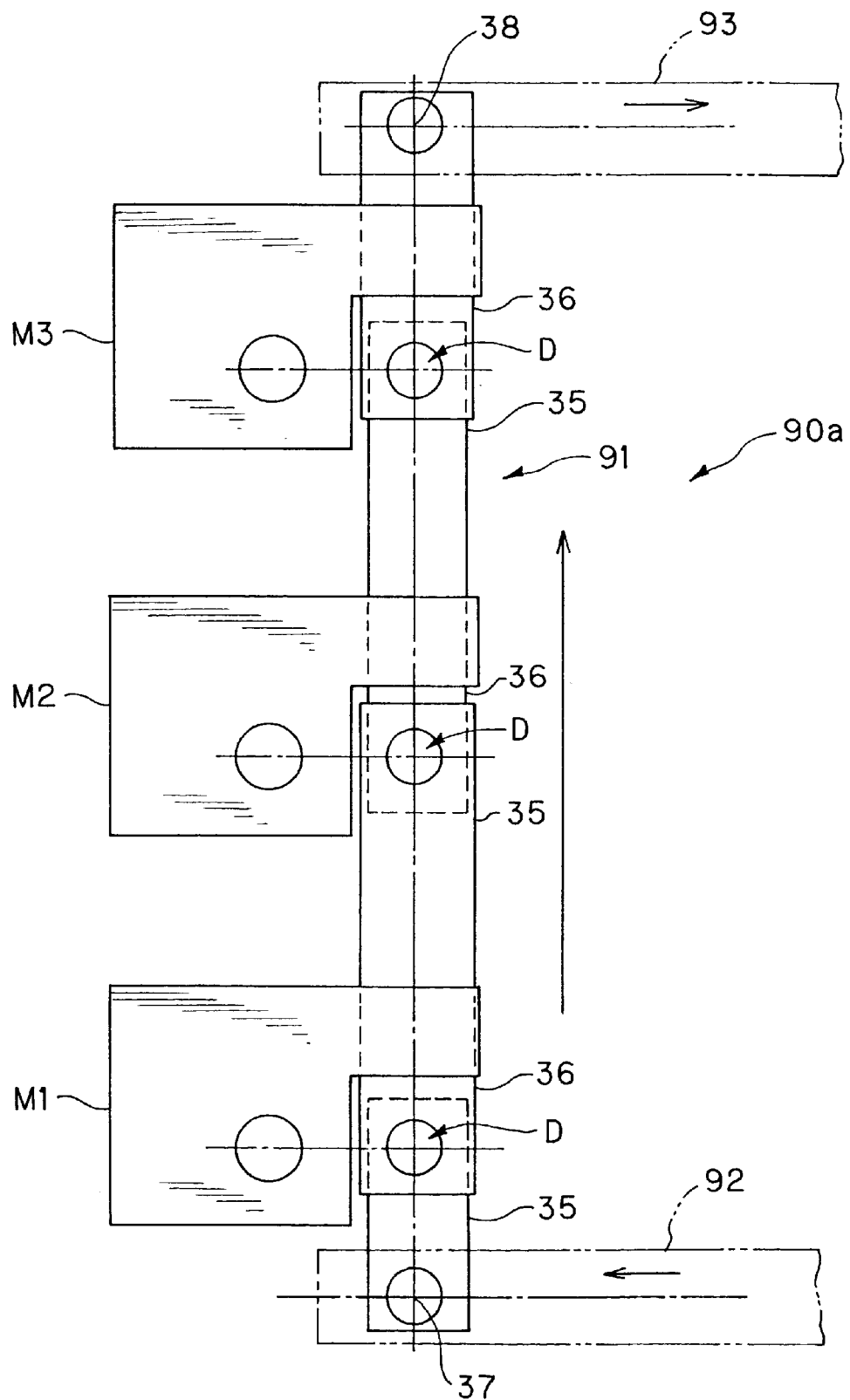

FIGS. 8A, 8B and 9 are schematic views of machining systems 90 and 90a according to the invention.

FIGS. 8A and 8B show the machining system 90 which is used for machining the works in order. In this system, a plurality of movable spindle type machine tools M1 and M2 are arranged and juxtaposed laterally in series with each other. FIGS. 8A and 8B are a schematic plan view and frontal view.

As shown in FIGS. 8A and 8B, the machine tool M1 and another adjacent machine tool M2 are connected by the work transfer apparatus 91 to feed the work in order. The work is machined in order by the respective machine tools M1 and M2. The work transfer apparatus 91 has a structure combining the structure of the above-described work transfer apparatus 3 with the structure of the work transfer apparatus 3a having an reversed structure in the vertical direction.

With respect to the upstream machine tool M1, the non-machined work transfer portion 35 is arranged in the lower stage and the machined work transfer portion 36 is arranged in the upper stage so that these transfer portions 35 and 36 are directed reversely, i.e., in the direction substantially at 180 degrees.

On the other hand, the machined work transfer portion 36 of the upstream machine tool M1 is used as the non-machined work transfer portion 35 of the downstream machine tool M2. The reason for this is that the machined work of the upstream machine tool M1 corresponds to the non-machined work in the downstream machine tool M2 for performing the next machining operation.

Namely, in the machine tool M2, the non-machined work transfer portion 35 is arranged in the upper stage and the machined work transfer portion 36 is arranged in the lower stage. The transfer portions 35 and 36 are directed substantially in an opposite direction at 180 degrees.

Thus, the structures of the work transfer apparatus 3 and 3a are combined with each other so that the machine tools M1 and M2 may be kept substantially at the same level.

In another machining system 90a shown in FIG. 9, a plurality of machine tools M1, M2 and M3 are arranged and juxtaposed laterally in series with each other to machine the works in order. Then, the adjacent machine tools are connected to each other through the work transfer apparatus 91 to transfer the works in order.

Also, a transfer loader 92 for loading the work is provided at the work loading position 37. Another transfer loader 93 for unloading the work is provided at the work unloading position 38. The work is automatically loaded and unloaded by the transfer loaders 92 and 93. Thus, it is possible to automate the machining system 90a.

According to the machining systems 90 and 90a with the above-described structure, the plurality of movable spindle type machine tools are arranged as desired and the machine tools are connected by the work transfer apparatus 91 to make it possible to transfer the work.

Accordingly, since it is unnecessary to use a work transfer apparatus of a conventional conveyer type with a large size, it is possible to make compact the machining systems 90 and 90a as a whole. Also, it is possible to arrange and design the machining system in conformity with a space available in the factory as desired.

As described above, in the work transfer apparatus 3, 3a and 91 according to the present invention, the non-machined work transfer portion 35 and the machined work transfer portion 36 are formed into a two-stage structure. Accordingly, it is possible to make compact the work transfer apparatus to therefore downsize the lathe 1, the machine tools M1, M2 and M3 and the machining system as a whole. Also, it is possible to shorten the work changing time.

Also, even if a diameter of the work is large, it is sufficient to increase the size of the pallets 32 and 33 arranged in the two-stage manner in conformity with the works to be machined. Accordingly, the area of installation of the work transfer apparatus itself is hardly enlarged. As a result, it is possible to commonly use a machine tool for machining a work having a large diameter and a machine tool for machining a work having a standard size.

The worker may perform only the change of the works in the work changing position E. Accordingly, it is possible to change the works without performing an unreasonable operation such as lifting the work upwardly. Thus, in the case where the weight of the work is relatively heavy or the number of the works to be changed is large, it is possible to more reduce the load to be imposed on the worker who performs the change of the works than in the conventional case.

Also, the machined work photoelectric sensor 76 is provided for the interlock for allowing only the movable members such as the headstock 4 to move toward the work transfer apparatus 3 and 3a only when the safety condition is established. Thus, it is possible to prevent the interference between the movable members and the work transfer apparatus to enhance the safety feature.

According to the invention, since the dimension in the X-axis direction of the lathe is reduced, the movement distance in the X-axis direction of the headstock 4 is shortened. Also, the headstock 4 may substantially perform the reception/release of the works only by its lowering motion in the work receiving/sending position D. Accordingly, since the movement distance of the headstock 4 as a whole for the reception and release of the works, it is possible to shorten the work changing time.

Incidentally, the same reference numerals in each drawing designate the same or like portions.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A work transfer method for transferring a work to a machine tool with a movable main spindle in which a headstock for rotatably supporting the main spindle moves at least in an axial direction of the spindle and in a direction perpendicular to an axis of the spindle, the work being transferred to said machine tool and being received or sent between a work transfer apparatus and a chuck provided at a lower end of the spindle, said method comprising the following steps of:

disposing a machined work transfer portion for laying and transferring a machined work sent from the chuck on a machined work placement portion in an upper stage or a lower stage of a non-machined work transfer portion for laying and transferring a non-machined work for being received by the chuck on a non-machined work placement portion;

moving said non-machined work placement portion between a non-machined work receiving position for the chuck to receive the non-machined work for machining the work in said machine tool and a work loading position for loading the non-machined work; and moving said machined work placement portion between a machined work sending position for the chuck to lay and send the machined work which has been machined by said machine tool, said machined work sending position being located in an upper or lower position of said non-machined work receiving position, and a work unloading position for unloading the machined work, whereby a reception or release of the work is performed between the chuck and said work transfer apparatus.

2. The work transfer method according to claim 1, wherein said non-machined work receiving position and said machined work sending position are located on a movement path of the headstock, and the movement path is directed in parallel with a direction perpendicular to the axis of said spindle.

3. A work transfer apparatus for transferring a work to a machine tool with a movable main spindle in which a headstock for rotatably supporting the main spindle moves at least in an axial direction of the spindle and in a direction perpendicular to an axis of the spindle, the work being received or sent between said work transfer apparatus and a chuck provided at a lower end of the spindle, said work transfer apparatus comprising:

a work transfer apparatus base provided at a predetermined position in the vicinity of a machine body of said machine tool;

a non-machined work transfer portion provided on said base for laying a non-machined work, which is to be received by the chuck, on a non-machined work placement portion and for transferring the non-machined work; and a machined work transfer portion provided on said base and disposed in an upper stage or a lower stage of said non-machined work transfer portion for laying a machined work, which has been sent from the chuck, on a machined work placement portion and for transferring the machined work, wherein said non-machined work placement portion of said non-machined work transfer portion moves between a non-machined work receiving position where the chuck receives the non-machined work to be machined by said machine tool and a work loading position where the non-machined work is loaded, and wherein said machined work placement portion of said machined work transfer portion moves between a machined work sending position, which is located above or below said non-machined work receiving position, where the chuck sends the machined work of which a machining operation is effected by said machine tool and a work unloading position where the machined work is unloaded, whereby a reception or release of the work is performed between the chuck and said work transfer apparatus.

4. The work transfer apparatus according to claim 3, wherein said non-machined work receiving position and said machined work sending position are located on a movement path of the headstock, and the movement path is directed in parallel with a direction perpendicular to the axis of the spindle.

5. The work transfer apparatus according to claim 3, wherein said machined work transfer portion is located in the upper stage and said non-machined work transfer portion is located in the lower stage.

6. The work transfer apparatus according to claim 5, wherein said non-machined work transfer portion and said machined work transfer portion are provided on said base to be overlapped substantially with one on the other, and said non-machined work placement portion and said machined work placement portion are moved in the same direction.

7. The work transfer apparatus according to claim 6, wherein said machined work transfer portion is provided so as to straddle said non-machined work transfer portion upwardly and outwardly so that said non-machined work transfer portion and said machined work transfer portion do not interfere with each other and may transfer the non-machined work and the machined work independently, respectively.

8. The work transfer apparatus according to claim 6, wherein the positions of said non-machined work transfer portion and said machined work transfer portion are somewhat offset from each other by a predetermined distance in a moving direction of the headstock perpendicular to the axis of the spindle.

9. The work transfer apparatus according to claim 5, wherein said non-machined work transfer portion and said machined work transfer portion are arranged to move in different directions.

10. The work transfer apparatus according to claim 3, wherein said non-machined work transfer portion is located in the upper stage and said machined work transfer portion is located in the lower stage, and during the operation in which the chuck lays the machined work onto said machined work placement portion of said machined work transfer portion of the lower stage in said machined work sending position, said non-machined work transfer portion of the upper stage is retracted to a retracted position.

11. The work transfer apparatus according to claim 10, wherein said non-machined work transfer portion and said machined work transfer portion are provided on said base to be overlapped substantially with one on the other, and said non-machined work placement portion and said machined work placement portion are moved in the same direction.

12. The work transfer apparatus according to claim 11, wherein the positions of said non-machined work transfer portion and said machined work transfer portion are somewhat offset from each other by a predetermined distance in a moving direction of the headstock perpendicular to the axis of the spindle.

13. The work transfer apparatus according to claim 10, wherein said non-machined work transfer portion and said machined work transfer portion are arranged to move in different directions.

14. The work transfer apparatus according to claim 3, wherein either one of the transfer portions of said non-machined work transfer portion and said machined work transfer portion is provided on said base, the other transfer portion is provided on said one transfer portion, and said non-machined work placement portion and said machined work placement portion are arranged to move in different directions.

15. The work transfer apparatus according to claim 3, wherein at least one of said non-machined work placement portion and said machined work placement portion is moved up and down so that the chuck can grip the work.

16. The work transfer apparatus according to claim 3, wherein said non-machined work receiving position and said machined work sending position have a common centerline directed vertically.

17. The work transfer apparatus according to claim 3, wherein said work loading position and said work unloading position are arranged to be offset from each other so that changing of the works is possible without any interference between said non-machined work placement portion and said machined work placement portion.

18. The work transfer apparatus according to claim 3, wherein said non-machined work transfer portion comprises: a pair of guide rails mounted on said base in a direction in parallel with a longitudinal centerline of said work transfer apparatus; a non-machined work moving carrier reciprocating by the guidance of said guide rails; and a first driving means for reciprocating said non-machined work moving carrier, wherein said non-machined work moving carrier comprises: a plurality of upper rollers mounted on both sides of the longitudinal centerline; and lower rollers arranged below and in the vicinity of the respective upper rollers, and said non-machined work moving carrier is disposed between said pair of guide rails, wherein said upper rollers and said lower rollers roll freely while said guide rail being sandwiched between said upper and lower rollers and while preventing said non-machined work moving carrier from moving up and down, wherein side rollers are mounted on both sides of the longitudinal centerline and are mounted on a front side and/or a rear side in a moving direction of said non-machined work moving carrier, wherein said side rollers roll along opposite side surfaces of the guide rails so that said non-machined work moving carrier is prevented from moving in a horizontal direction perpendicular to the longitudinal centerline, and wherein said non-machined work placement portion is mounted in the horizontal direction on a top portion of said non-machined work moving carrier.

19. The work transfer apparatus according to claim 18, wherein said non-machined work transfer portion comprises a supporting device provided on said non-machined work moving carrier, and wherein said supporting device has such a structure that said non-machined work placement portion is supported to be somewhat movable up and down and able to slant and said non-machined work placement portion is biased upwardly by a biasing member.

20. The work transfer apparatus according to claim 18, wherein said machined work transfer portion is located in the upper stage of said non-machined work transfer portion, wherein said machined work transfer portion comprises: a pair of guide rails; a machined work moving carrier movable by the guidance of said guide rails; and a second driving means for reciprocating said machined work moving carrier, wherein said pair of guide rails are mounted on said base in the direction parallel with the longitudinal centerline and are disposed outwardly and upwardly of said first-mentioned guide rails of said non-machined work transfer portion, wherein said machined work moving carrier is formed in in inverted U-shaped in cross section so as to straddle said non-machined work moving carrier, wherein said machined work moving carrier comprises: a plurality of upper rollers mounted on both sides of the longitudinal centerline; and lower rollers arranged below and in the vicinity of the respective upper rollers, wherein said upper rollers and said lower rollers roll freely while said guide rail being sandwiched between said upper and lower rollers and while preventing said machined work moving carrier from moving up and down, wherein side rollers are mounted on both sides of the longitudinal centerline on a front side or a rear side in a moving direction of said machined work moving carrier, wherein said side rollers roll along opposite side surfaces of the guide rails so that said machined work moving carrier is prevented from moving in a horizontal direction perpendicular to the longitudinal centerline, and wherein said machined work placement portion is mounted in the horizontal direction on a top portion of said machined work moving carrier.

21. The work transfer apparatus according to claim 20, wherein in said non-machined work transfer portion, stoppers which may adjust the position of said non-machined work moving carrier and may position said non-machined work placement portion in said non-machined work receiving position are provided on said base, wherein in said machined work transfer portion, other stoppers which may adjust the position of said machined work moving carrier and may position said machined work placement portion in said machined work sending position are provided on said base, and wherein in said work loading position and said work unloading position, further other stoppers which position said non-machined work moving carrier and said machined work moving carrier, respectively, are mounted on said base.

22. The work transfer apparatus according to claim 20, wherein said work loading position and said work unloading position are set up to be overlapped with each other about the same center position in the vertical direction, and when the machined work is removed from said machined work placement portion of the upper stage, said machined work moving carrier is retracted along the longitudinal centerline to expose said non-machined work moving carrier of the lower stage so that the non-machined work is layable on said non-machined work placement portion substantially at the same position as the position where the work has been removed.

23. The work transfer apparatus according to claim 3, further comprising a machined work presence detecting means fordetecting whether ornot an interfering object is laid on a top surface of said machined work placement portion when said machined work placement portion is positioned in said machined work sending position.

24. The work transfer apparatus according to claim 23, further comprising a non-machined work presence detecting means for detecting whether or not the non-machined work is laid on a top surface of said non-machined work placement portion when said non-machined work placement portion is positioned in said non-machined work receiving position.

25. The work transfer apparatus according to claim 3, wherein the axis of the spindle of said machine tool is directed in a vertical direction to a floor surface or in a direction slanted at a predetermined angle relative to the vertical direction.

26. A machining system in which a plurality of machine tools with movable main spindles are juxtaposed, and each machine tool and the adjacent machine tool are connected by at least one apparatus for transferring a work in order and the work is machined in said plurality of machine tools, wherein in said machine tool with a movable main spindle, a headstock for rotatably supporting said movable main spindle moves at least in an axial direction of the spindle and in a direction perpendicular to an axis of the spindle, the work being transferred between said work transfer apparatus and said machine tool and being received or sent between said work transfer apparatus and a chuck provided at a lower end of the spindle, wherein said work transfer apparatus comprises:

a work transfer apparatus base provided at a predetermined position in the vicinity of a machine body of said machine tool;

a non-machined work transfer portion provided on said base for laying a non-machined work, which is to be received by the chuck, on a non-machined work placement portion and for transferring the non-machined work; and a machined work transfer portion provided on said base and disposed in an upper stage or a lower stage of said non-machined work transfer portion for laying a machined work, which has been sent from the chuck, on a machined work placement portion and for transferring the machined work, wherein said non-machined work placement portion of said non-machined work transfer portion moves between a non-machined work receiving position where the chuck receives the non-machined work to be machined by said machine tool and a work loading position where the non-machined work is loaded, and wherein said machined work placement portion of said machined work transfer portion moves between a machined work sending position, which is located above or below said non-machined work receiving position, where the chuck sends the machined work of which a machining operation is effected by said machine tool and a work unloading position where the machined work is unloaded, whereby, a reception or release of the work is performed between the chuck and said work transfer apparatus.

27. The machining system according to claim 26, wherein said one work transfer apparatus in which said machined work transfer portion is arranged in an upper stage and said non-machined work transfer portion is arranged in a lower stage and another work transfer apparatus in which said non-machined work transfer portion is arranged in an upper stage and said machined work transfer portion is arranged in a lower stage are used in combined, and said non-machined work transfer portion and said machined work transfer portion are arranged to be directed in different directions so that said machine tools are connected with each other by said work transfer apparatus.

28. The machining system according to claim 26, wherein a transfer loader for loading the work is provided at said work loading position and another transfer loader for unloading the work is provided at said work unloading position to thereby automatically load and unload the work.

* * * * *